(12) United States Patent
Gupta et al.

(10) Patent No.: US 11,783,615 B2
(45) Date of Patent: Oct. 10, 2023

(54) SYSTEMS AND METHODS FOR LANGUAGE DRIVEN GESTURE UNDERSTANDING

(71) Applicants: Sandeep Gupta, Tempe, AZ (US); Ayan Banerjee, Tempe, AZ (US)

(72) Inventors: Sandeep Gupta, Tempe, AZ (US); Ayan Banerjee, Tempe, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 67 days.

(21) Appl. No.: 17/353,312

(22) Filed: Jun. 21, 2021

(65) Prior Publication Data

US 2021/0397266 A1    Dec. 23, 2021

Related U.S. Application Data

(60) Provisional application No. 63/041,746, filed on Jun. 19, 2020.

(51) Int. Cl.
| | |
|---|---|
| G06V 40/10 | (2022.01) |
| H04W 4/02 | (2018.01) |
| G06N 20/10 | (2019.01) |
| G06F 1/16 | (2006.01) |
| H04W 4/80 | (2018.01) |
| G06V 20/40 | (2022.01) |

(Continued)

(52) U.S. Cl.
CPC .......... *G06V 40/107* (2022.01); *G06F 1/163* (2013.01); *G06F 3/017* (2013.01); *G06N 3/08* (2013.01); *G06N 20/10* (2019.01); *G06V 20/46* (2022.01); *G06V 40/28* (2022.01); *H04W 4/027* (2013.01); *H04W 4/80* (2018.02)

(58) Field of Classification Search
CPC ...... G06V 40/107; G06V 20/46; G06V 40/28; G06V 10/82; G06F 1/163; G06F 3/017; G06F 3/0304; G06N 3/08; G06N 20/10; G06N 3/0454; G06N 3/045; H04W 4/027; H04W 4/80
See application file for complete search history.

(56) References Cited

U.S. PATENT DOCUMENTS

2018/0307319 A1* 10/2018 Karmon ................. G06V 40/28
2020/0074836 A1    3/2020 Kolavennu
(Continued)

OTHER PUBLICATIONS

A. E. F. Da Gama, T. M. Chaves, L. S. Figueiredo, A. Baltar, M. Meng, N. Navab, V. Teichrieb, and P. Fallavollita, "Mirrarbilitation: A clinically-related gesture recognition interactive tool for an ar rehabilitation system," Computer methods and programs in biomedicine, vol. 135, pp. 105-114, 2016.

(Continued)

*Primary Examiner* — Grant Sitta
(74) *Attorney, Agent, or Firm* — POLSINELLI PC

(57) ABSTRACT

A system and associated methods/processes includes a sensor operable to capture sensor data indicative of a gesture; and a processor in communication with a memory and the sensor. The processor is configured to execute instructions stored in the memory, which, when executed, cause the processor to access the sensor data and decompose the gesture into a canonical gesture form defining a string of gesture components arranged in a spatio-temporal order.

18 Claims, 13 Drawing Sheets

(51) Int. Cl.
*G06V 40/20* (2022.01)
*G06F 3/01* (2006.01)
*G06N 3/08* (2023.01)

(56) References Cited

U.S. PATENT DOCUMENTS

2020/0075167 A1   3/2020  Srivastava
2021/0182618 A1*  6/2021  Hoffmann ............ G06K 9/6259

OTHER PUBLICATIONS

A. Esteva, B. Kuprel, R. A. Novoa, J. Ko, S. M. Swetter, H. M. Blau, and S. Thrun, "Dermatologist-level classification of skin cancer with deep neural networks," Nature, vol. 542, No. 7639, p. 115, 2017.

A. Khosrowpour, J. C. Niebles, and M. Golparvar-Fard, "Vision-based workface assessment using depth images for activity analysis of interior construction operations," Automation in Construction, vol. 48, pp. 74-87, 2014.

B. Romera-Paredes and P. Torr, "An embarrassingly simple approach to zero-shot learning," in International Conference on Machine Learning, 2015, pp. 2152-2161.

C. Neidle, A. Thangali, and S. Sclaroff, "Challenges in development of the American sign language lexicon video dataset (asllvd) corpus," in 5th Workshop on the Representation and Processing of Sign Languages: Interactions between Corpus and Lexicon, LREC. Citeseer, 2012.

C. Szegedy, V. Vanhoucke, S. Ioffe, J. Shlens, and Z. Wojna, "Rethinking the inception architecture for computer vision," in Proceedings of the IEEE conference on computer vision and pattern recognition, 2016, pp. 2818-2826.

C. Wang, Z. Sarsenbayeva, X. Chen, T. Dingler, J. Goncalves, and V. Kostakos. Accurate measurement of handwash quality using sensor armbands: Instrument validation study. JMIR MHealth UHealth, 8(3), 2020.

CDC handwashing guidelines, https://www.cdc.gov/ handwashing/when-how-handwashing.html, 2020.

D. J. Napoli and J. Wu, "Morpheme structure constraints on two-handed signs in American sign language: Notions of symmetry," Sign language & linguistics, vol. 6, No. 2, pp. 123-205, 2003.

E. Kodirov, T. Xiang, and S. Gong, "Semantic autoencoder for zero-shot learning," in Proceedings of the IEEE Conference on Computer Vision and Pattern Recognition, 2017, pp. 3174-3183.

E. Kutafina, D. Laukamp, R. Bettermann, U. Schroeder, and S. M. Jonas. Wearable sensors for elearning of manual tasks: Using forearm emg in hand hygiene training. Sensors, 16(8):1221, 2016.

G. Papandreou, T. Zhu, N. Kanazawa, A. Toshev, J. Tompson, C. Bregler, and K. Murphy, "Towards accurate multi-person pose estimation in the wild," in Proceedings of the IEEE Conference on Computer Vision and Pattern Recognition, 2017, pp. 4903-4911.

H. Lalazar, L. Abbott, and E. Vaadia, "Tuning curves for arm posture control in motor cortex are consistent with random connectivity," PLoS computational biology, vol. 12, No. 5, p. e1004910, 2016.

H. Van Der Hulst and R. Channon, Notation systems. na, 2010.

H. Zhong, S. S. Kanhere, and C. T. Chou. Washindepth: Lightweight hand wash monitor using depth sensor. In Proceedings of the 13th International Conference on Mobile and Ubiquitous Systems: Computing, Networking and Services, MOBIQUITOUS 2016, p. 28-37, New York, NY, USA, 2016. Association for Computing Machinery.

J. A. Salman], S. Hani, N. [de Marcellis-Warin], and S. F. Isa]. Effectiveness of an electronic hand hygiene monitoring system on healthcare workers' compliance to guidelines. Journal of Infection and Public Health, 8(2):117-126, 2015.

J. Boyce, Y. Chartier, M. Chraiti, B. Cookson, N. Damani, S. Dharan, et al. Who guidelines on hand hygiene in health care. Geneva: World Health Organization, 2009.

L. Zhou, W. Li, P. Ogunbona, and Z. Zhang, "Jointly learning visual poses and pose lexicon for semantic action recognition," IEEE Transactions on Circuits and Systems for Video Technology, 2019.

N. Madapana and J. P. Wachs, "Hard zero shot learning for gesture recognition," in 2018 24th International Conference on Pattern Recognition (ICPR). IEEE, 2018, pp. 3574-3579.

N.-C. N. Chang, H. S. Reisinger, A. R. Jesson, M. L. Schweizer, D. J. Morgan, G. N. Forrest, and E. N. Perencevich. Feasibility of monitoring compliance to the my 5 moments and entry/exit hand hygiene methods in us hospitals. American journal of infection control, 44(8):938-940, 2016.

O. Russakovsky, J. Deng, H. Su, J. Krause, S. Satheesh, S. Ma, Z. Huang, A. Karpathy, A. Khosla, M. Bernstein et al., "Imagenet large scale visual recognition challenge," International journal of computer vision, vol. 115, No. 3, pp. 211-252, 2015.

P. Paudyal, J. Lee, A. Kamzin, M. Soudki, A. Banerjee, and S. K. Gupta, "Learn2sign: Explainable ai for sign language learning." in IUI Workshops, 2019.

S. Liu, M. Yamada, N. Collier, and M. Sugiyama. Change-point detection in time-series data by relative density-ratio estimation. Neural Networks, 43:72-83, 2013.

SignSavvy, 2019, last accessed Sep. 1. [Online]. Available: https://www.signingsavvy.com.

T. Zhou, "Early turn-taking prediction for human robot collaboration," Ph.D. dissertation, Purdue University, 2018.

W. C. Stokoe Jr, "Sign language structure: An outline of the visual communication systems of the American deaf," Journal of deaf studies and deaf education, vol. 10, No. 1, pp. 3-37, 2005.

X. Zhang, K. Kadimisetty, K. Yin, C. Ruiz, M. G. Mauk, and C. Liu. Smart ring: a wearable device for hand hygiene compliance monitoring at the point-of-need. Microsystem Technologies, 25(8):3105-3110, 2019.

Y. C. Bilge, N. Ikizler-Cinbis, and R. G. Cinbis, "Zero-shot sign language recognition: Can textual data uncover sign languages?" arXiv preprint arXiv:1907.10292, 2019.

Y. Fu, T. M. Hospedales, T. Xiang, and S. Gong, "Transductive multi-view zero-shot learning," IEEE transactions on pattern analysis and machine intelligence, vol. 37, No. 11, pp. 2332-2345, 2015.

Y. Xian, B. Schiele, and Z. Akata, "Zero-shot learning-the good, the bad and the ugly," in Proceedings of the IEEE Conference on Computer Vision and Pattern Recognition, 2017, pp. 4582-4591.

Office Action issued in related U.S. Appl. No. 17/353,241 dated Feb. 2, 2023, 19 pages.

\* cited by examiner

220/260 — DECOMPOSE THE GESTURE INTO A CANONICAL GESTURE FORM, THE CANONICAL GESTURE FORM DEFINING A STRING OF GESTURE COMPONENTS ARRANGED IN A SPATIO-TEMPORAL ORDER

221 — EXTRACT, FOR A FRAME OF THE PLURALITY OF FRAMES, A FIRST GESTURE COMPONENT ASSOCIATED WITH A PHYSICAL LOCATION OF A PALM OF A HAND RELATIVE TO A BODY USING A NEURAL NETWORK

224 — EXTRACT, FOR A FRAME OF THE PLURALITY OF FRAMES, A SECOND GESTURE COMPONENT ASSOCIATED WITH A PHYSICAL MOVEMENT OF A PALM OF A HAND RELATIVE TO A BODY USING A NEURAL NETWORK

227 — EXTRACT, FOR A FRAME OF THE PLURALITY OF FRAMES, A THIRD GESTURE COMPONENT ASSOCIATED WITH A SHAPE OF A HAND RELATIVE TO A BODY USING A NEURAL NETWORK

250 — RECEIVE SENSOR DATA INDICATIVE OF A GESTURE, THE SENSOR DATA INCLUDING A PLURALITY OF FRAMES, EACH FRAME INCLUDING DATA INDICATIVE OF A HAND PERFORMING THE GESTURE

260 — DECOMPOSE THE GESTURE INTO A CANONICAL GESTURE FORM USING ONE OR MORE NEURAL NETWORKS, THE CANONICAL GESTURE FORM DEFINING A STRING OF GESTURE COMPONENTS ARRANGED IN A SPATIO-TEMPORAL ORDER AND THE NEURAL NETWORK BEING OPERABLE TO RECOGNIZE EACH GESTURE COMPONENT IN THE CANONICAL GESTURE FORM USING A PLURALITY OF EXAMPLES ASSOCIATED WITH THE GESTURE

270 — COMPARE THE CANONICAL GESTURE FORM FOR THE GESTURE WITH A GESTURE DEFINITION, WHEREIN THE GESTURE DEFINITION INCLUDES A PLURALITY OF CONSTRAINTS ASSOCIATED WITH A PLURALITY OF GESTURE COMPONENTS

| Gesture | Definition | | Handshape | | | | | Movement | | | Location | |
|---|---|---|---|---|---|---|---|---|---|---|---|---|
| | | top 0 | top 1 | top 2 | top 3 | top 4 | top 0 | top 1 | top 2 | top 0 | top 1 | top 2 |
| tail | H4 L1 M3 H4 L1 | H4(can) | H13(here) | H4(adopt) | H5(advantage) | H4(anti) | M3 | M0 | M6 | add | alive | appetite |
| | H11 M16 H1 L1 | H13(here) | H17(sorry) | H4(can) | H18(hospital) | H3(and) | M1 | M8 | M3 | help | sorry | add |
| | H10 L4 M3 H10 L4 | H5(cat) | H10(Gold) | H8(hello) | H1(hearing) | H1(deaf) | M3 | M3 | M0 | deaf | father | cat |
| | H10 M0 H1 L1 | H17(sorry) | H5(decide) | H1(tail) | H14(hospital) | H3(and) | M0 | M13 | M1 | after | bar | and |
| hearing | H1 L3 M3 H1 L4 | H5(cat) | H9(gold) | H6(hello) | H8(father) | H15(if) | M3 | M3 | M3 | tiger | cat | deaf |
| cheer | H2 L1 M8 H2 L4 | H6(cop) | H17(sorry) | H17(alive) | H6(appetite) | H3(and) | M3 | M1 | M3 | find | help | add |
| | H5 L0 M2 H5 L1 | H1(hurt) | H18(large) | H5(decide) | H12(help) | H17(sorry) | M2 | M2 | M6 | and | after | hurt |
| | H6 L1 M0 H6 L1 | H3(and) | H5(cop) | H5(cop) | H14(hospital) | H1(deaf) | M0 | M0 | M3 | help | add | alive |
| agree | H4 L4 M7 H4 L4 | H5(advantage) | H4(adopt) | H4(adopt) | H13(here) | H4(task) | M0 | M7 | M0 | cat | father | phone |
| agape | H18 L0 M2 H4 L1 | H3(and) | H5(Advantage) | H18(add) | H6(appetite) | H4(adopt) | M2 | M2 | M0 | large | adopt | cop |
| advent | H17 L1 M1 H17 L1 | H2(cheer) | H5(cop) | H6(appetite) | H4(alloone) | H3(and) | M1 | M5 | M13 | add | appetite | cop |
| advantage | H11 M0 H1 L1 | H4(can) | H3(and) | H5(advantage) | H21(agape) | H21(agape) | M0 | M0 | M3 | good_night | advent | cost |
| | H21 L4 M0 H21 L1 | H7(cost) | H1(agree) | H1(deaf) | H4(adopt) | H1(tail) | M15 | M3 | M0 | cheer | cost | advent |
| advent | H4(anti) | H4(anti) | H1(about) | H4(adopt) | H13(here) | H17(sorry) | M9 | M8 | M0 | cost | good_night | agape |
| advance | H5 L0 M0 H5 L0 | H4(can) | H4(adopt) | H3(and) | H4(and) | H13(here) | M5 | M0 | M13 | about | can | here |
| advance | H19 L3 M1 H19 L3 | H19(adult) | H8(hello) | H8(hello) | H13(here) | H10(gold) | M4 | M0 | M5 | go_out | go_out | hearing |
| | H19 L3 M1 H19 L3 | H19(advance) | H5(Advantage) | H13(here) | H10(gold) | H6(father) | M1 | M12 | M5 | go_out | advance | hearing |
| adopt | H18 L0 M1 H4 L1 | H19(advantage) | H4(can) | H4(can) | H4(and) | H1(tail) | M1 | M6 | M0 | large | all_gone | sorry |
| | H18 L1 M0 H3 L1 | H18(all_gone (S)) | H4(can) | H4(can) | H3(and) | H1(agree) | M3 | M0 | M0 | help | sorry | alive |

FIG. 7

SYSTEMS AND METHODS FOR LANGUAGE DRIVEN GESTURE UNDERSTANDING

CROSS-REFERENCE TO RELATED APPLICATIONS

This is a non-provisional application that claims benefit to U.S. Provisional Patent Application Ser. No. 63/041,746 filed 19 Jun. 2020, which is herein incorporated by reference in its entirety.

FIELD

The present disclosure generally relates systems and methods for language driven gesture understanding.

BACKGROUND

Learning concepts is a high-level cognitive task that is at the frontier of Artificial Intelligence (AI) research. In a recognition problem, concepts are attributes of examples, which exhibit the following properties: a) soft matching, where two concepts $c1$ and $c2$, are considered to be equal if $dist(c1, c2) \le \varepsilon$, where $\varepsilon > 0$ governs the degree of match, b) structure, an example can be expressed as a combination of the concepts following a temporal or spatial order, c) uniqueness, each example has a unique unambiguous structural representation in terms of concepts, and d) coverage, every example in the given recognition problem has a structural representation in terms of the concepts.

Enabling a machine to recognize concepts can potentially increase the number of examples that can be correctly identified by it. As shown in FIG. 1, domain experts provide classes which are divided into two groups: a) seen classes, where examples are available, and b) unseen classes, where examples are unavailable. Every class can be defined using a spatio-temporal ordering of a set of concepts, which is provided by the expert. This is the canonical form for a class.

Canonical form has two properties: a) it is machine readable encoding, and b) each class has a unique canonical form.

Examples from seen classes can be used to learn models that can recognize each concept. In the testing phase, given the first example of a previously unseen class, the canonical form can be utilized to segment. Each segment can then be compared with concept models. The comparison output and canonical form of unseen class can be utilized for recognition.

In the example of the American Sign Language (ASL) recognition problem, all of the nearly 10,000 gestures for English words are composed using a set of over 80 handshapes, six locations and around 20 unique movements. Each handshape, movement and location has a semantic relation with the English word and can be considered as concepts. Each gesture can be expressed using a unique ordering of start handshape, start location, a movement type, end handshape and end location, which is the canonical form for that gesture. If a machine learns these unique concepts, then by combining them following a language, the machine can potentially recognize gestures that it has never seen before. This concept of recognizing previously unseen classes without access to training data is known as zero-shot learning. It can be used for many purposes such as ASL learning, training personnel in various domains such as construction or military or validating the quality of unsupervised physiotherapeutic exercises.

It is with these observations in mind, among others, that various aspects of the present disclosure were conceived and developed.

BRIEF DESCRIPTION OF THE DRAWINGS

FIGS. 3A-3F are a series of process flow diagrams showing a process for zero-shot recognition of a gesture-based language;

FIG. 4 is a chart showing a handshape alphabet generated from 23 training gestures from 130 users;

FIG. 5 is a table showing a movement alphabet generated from 23 training gestures from 130 users;

FIG. 7 is a table showing zero-shot recognition results of 19 unseen test gestures from three unseen users (gray boxes denote successful zero-shot recognition; white boxes denote failure cases; light gray boxes indicate an absence of an alphabet in training gestures; bolded font indicates a match and a standard font indicates no match);

Corresponding reference characters indicate corresponding elements among the view of the drawings. The headings used in the figures do not limit the scope of the claims.

DETAILED DESCRIPTION

Figure 1:
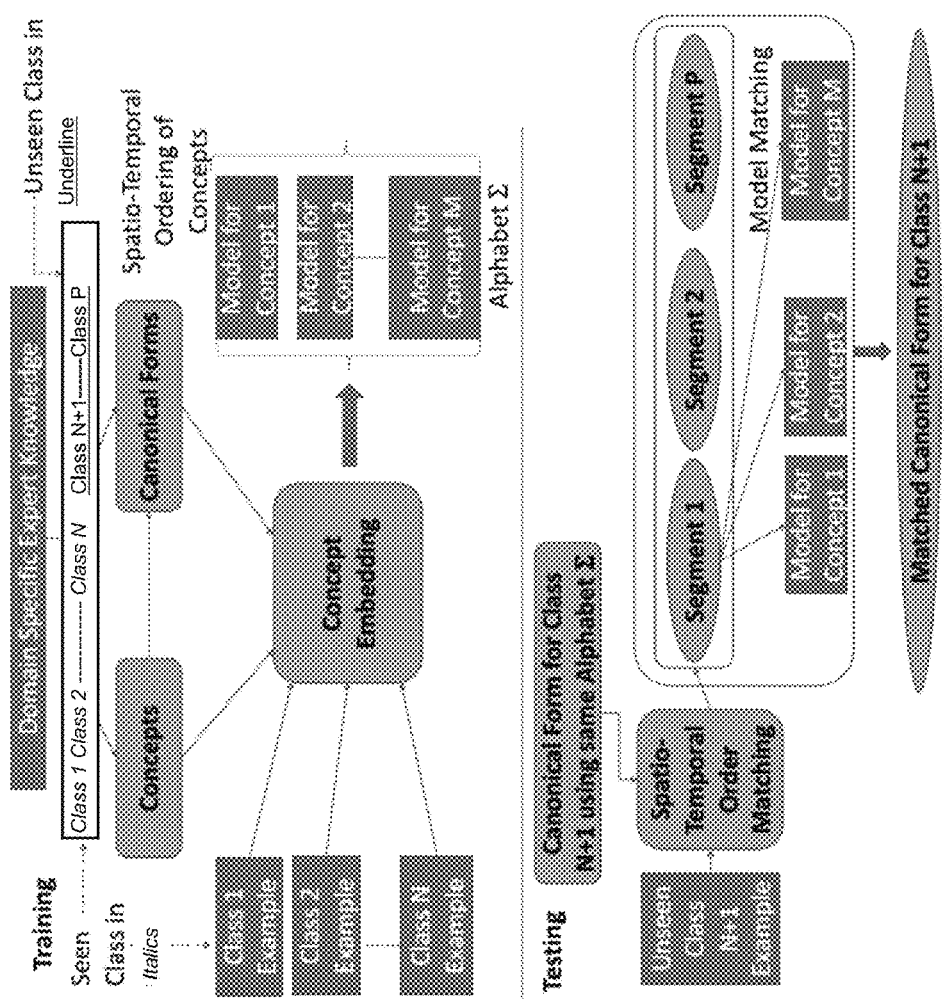
FIG. 1 is a diagram showing concept embedding for zero-shot recognition.

The present disclosure discloses a system and associated process for zero-shot learning of gesture-based languages using a canonical form as an intermediate modular representation. A fundamental difference in the present system is in the definition of a concept that enables soft matching and the usage of canonical forms that convert an example into concepts arranged in spatiotemporal order. In particular, the present system and processes apply this embedding strategy for zero-shot learning of ASL gestures. In experiments, two datasets were utilized: a) IMPACT Lab dataset, which includes 23 ASL gestures from 130 users to identify 19 unseen ASL gestures from seven users not part of the initial 130, and b) ASLTEXT dataset, from which 190 unseen gestures were collected in an independent experimental environment. In the IMPACT dataset gestures were performed with three repetitions each, resulting in a database size of 8,970 gesture executions. The present system's zero-shot mechanism can recognize 43 unseen gestures from both IMPACT and ASLTEXT datasets using training data from 23 gestures only obtained from the IMPACT dataset. The normalized accuracy as reported is around 66% for the present system, which is 13.6% higher than the state-of-art. Referring to the drawings, embodiments of a gesture recognition system and associated processes are illustrated and generally indicated as 100 and 200 in FIGS. 1-9.

A system 100 and associated process 200 that include a language model for recognizing and matching human hand gestures is included herein. In some embodiments, the language model is used to provide hand gesture templates for matching human hand gestures as performed by the user with existing hand gestures, defining individual gesture components (e.g. hand location, hand shape, motion) as gesture language concepts to form a language model that can use any combination of gesture components. The present disclosure further includes a system 100 for recognizing hand gesture components from a sequence of gestures. In some embodiments, the system 100 matches a sequence of hand gestures to an expression from the language model of the gesture. In some embodiments, the system 100 is used to recognize hand gestures. The system 100 can be used for real-time efficient recognition of gesture sequences, where gesture components can occur in any sequence and can be repeated any number of times, as typical spoken or gesture-based languages are used.

II. System Model and Problem Statement

In this section, the gesture recognition system model is discussed embodying canonical embedding of gesture language concepts.

The backbone of state-of-art zero-shot recognition is attribute-based learning. Here the raw data of a labeled training example is projected in a given attribute space and the resulting projection is qualified with a semantic meaning. An unseen test case with a semantic definition is then expressed as a combination of seen projections. The semantic meanings associated with each projection in the combination are then utilized to match with the given definition to recognize the unseen test case. The attributes that are learned from a seen training example are parameters such as weights of CNN layers or activation levels of neurons. These attributes may not be directly semantically relevant. They are rather outputs of a randomized learning algorithm, which are manually assigned semantic meaning by an expert observer. This results in drawbacks:

The projection domain shift problem, where due to differences in data distributions between two domains, examples with same semantic meanings may not have the same projections. Existing solutions to this problem typically increase the complexity of zero-shot learning with only incremental improvement in accuracy. For example, in the case of ASL recognition using video, data may be obtained from different environments resulting in significant variation in camera angles, background, and resolution. This can result in differences in projections of visually similar gesture examples.

Often exact matching of semantic mappings between examples of different classes is not required for correct recognition. For example, in ASL the exact pixel level location of a gesture is not important, rather the general proximity of the hand to a given part of the body is relevant. Current zero-shot techniques cannot benefit from such "soft" matching notions.

Semantic matching can be multi-dimensional with both spatial and temporal structures. For example, each gesture in ASL has a handshape at a certain location, (spatial information) transitioning to another handshape in the same or different location, resulting in a temporal evolution of spatial information. The state-of-art way to handle such spatiotemporal semantics will be to map to properties of 3D CNNs or RNNs, which can result in complex features increasingly making matching difficult.

Semantic matching between two classes may not spatiotemporally align. In ASL, gestures can have same handshapes but in different spatial locations or at varying times. As such semantic matching for ASL will require tackling both spatial and temporal alignments simultaneously which is far more difficult to achieve in zero-shot sense.

Video Based ASL Recognition

Video based gesture recognition has been a topic of recent interest among researchers in the mobile computing domain. Referring to FIGS. 2 and 3A-3F, given a set of videos of users performing a set of gestures in a given language such as ASL, along with correct labels, the system 100 recognizes executions of the same gestures by other users. In examples where the total number of possible gestures is limited, this approach is well established. However, in the case of language learning such as ASL, the number of possible gestures can be more than 10,000. Moreover, ASL is an organically generated language which is also constantly evolving with new gestures. In such cases, the requirement of available training examples for a given gesture is problematic.

Figure 2:
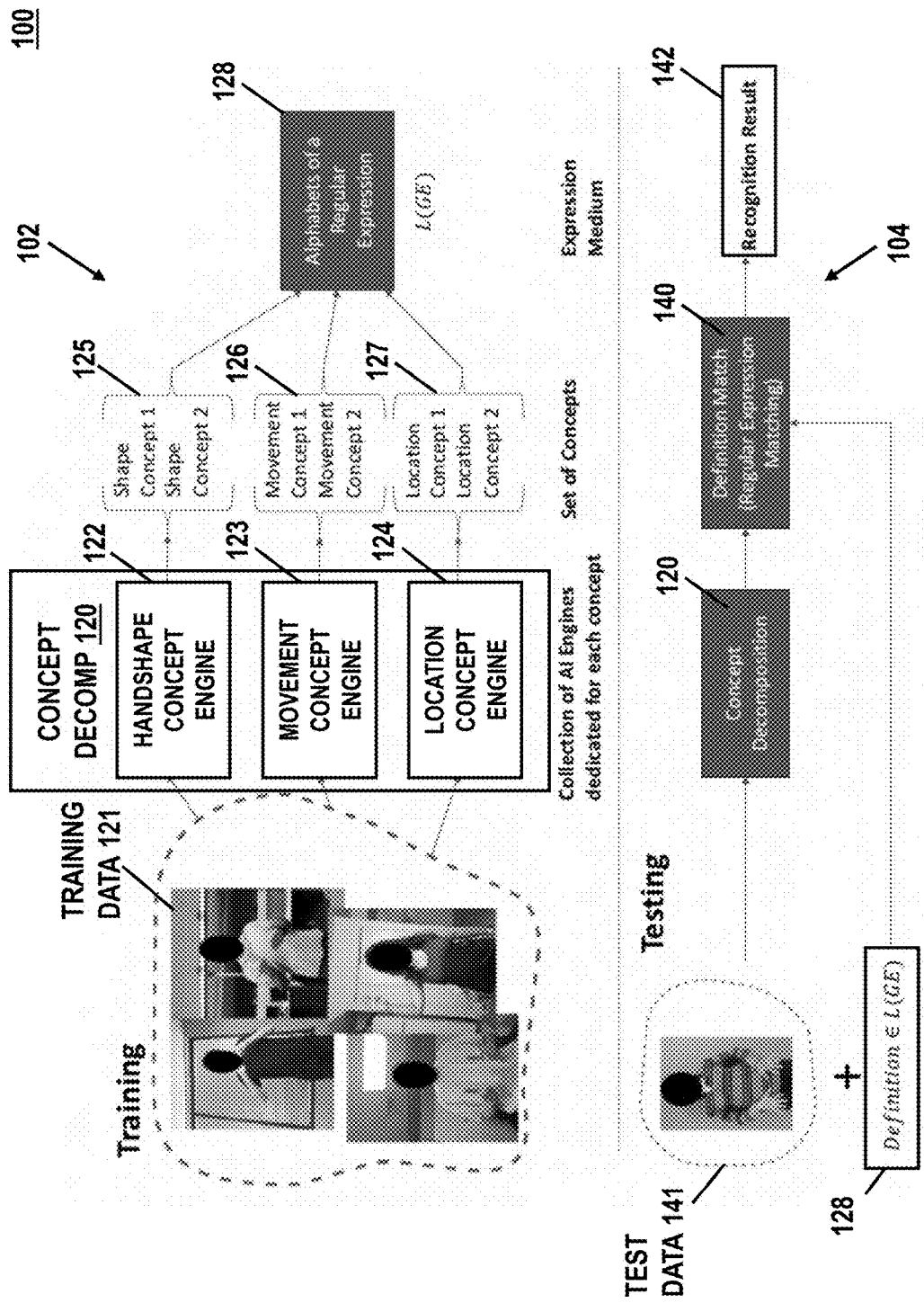
FIG. 2 is a diagram showing a system for applying concept embedding for a zero-shot recognition of a gesture-based language, including a training sub-system and a testing sub-system.

To overcome such requirements, the system 100 shown in FIG. 2 is considered. It is assumed that any user only performs few examples of a limited subset of gestures and labels them correctly. A gesture for which training examples are available is denoted by $S_G^i$. In addition to $S_G^i$, a user can also perform gestures which are previously unseen. Previously unseen gestures are denoted by $G_i$. Given such definitions, it is assumed that $\{S_G^1 \ldots S_G^n\} \cap \{G_1 \ldots G_m\} = \phi$ where $\phi$ is the empty set.

Canonical Form of ASL Gestures

The first step to defining the problem of zero-shot gesture understanding is to characterize a gesture. A gesture in ASL can be expressed using a set of regular expressions.

The present system 100 considers a set $\Sigma = \Sigma_H \cup \Sigma_L \cup \Sigma_M$ to define the alphabet of ASL. The alphabet of ASL includes three subsets, a) $\Sigma_H$ is a set of handshapes (ASL has a finite set of handshapes), b) $\Sigma_L$ is a set of locations (the head and torso region of the human body are divided into six buckets), and c) $\Sigma_M$ is a set of movements of the arm. The alphabets can be individually performed by the right or the left hand. A set of regular expressions, called Gesture Expression (GE) is defined as:

$$\text{Hand} \to \Sigma_H$$

$$\text{Mov} \to \Sigma_M$$

$$\text{Loc} \to \Sigma_L$$

$$\text{GE} \to \text{GE}_{Left} \text{GE}_{Right}$$

$$\text{GE}_X \to \text{Hand} | \epsilon, \text{ where } X \in \{\text{Right, Left}\}$$

$$\text{GE}_X \to \text{Hand Loc}$$

$$\text{GE} \to \text{Hand Loc Mov Hand Loc} \qquad (1)$$

Here, $\epsilon$ denotes null gesture, i.e. a particular hand is not used. A valid gesture is defined using Definition 1.

Definition 1: A gesture g is a valid gesture if and only if $g \in L(GE)$, where $L(GE)$ denotes the language of the regular expression GE in Equation 1.

Justification of Equation 1: A deeper analysis of ASL gestures also reveal that ASL only has a limited set of nearly 90 hand shapes with which all 10,000 ASL gestures can be executed. For analysis based on location, only the general position of the palm with respect to other parts of the body is semantically relevant. The palm's exact location in terms of absolute pixel numbers in the video frame is unnecessary. Only the start and end handshapes are required for expressing correct semantics in ASL, handshapes when moving from start handshape to end are irrelevant. Finally, ASL gestures only a specific set of movements of both arms, which is often limited by the human motor capabilities. Given such knowledge about ASL, the Definition 1 can encompass a significant percentage if not all of the ASL gesture dictionary.

Problem Definition

Definition 2 gives the problem statement.

Definition 2: Given:

Training videos of each gesture in the set $\{S_G^1 \ldots S_G^n\}$

Definitions of each gesture in the set $\{G_1 \ldots G_m\}$ in terms of regular expressions in Equation 1.

Recognize examples from $\{G_1 \ldots G_m\}$

Such that:

C1: $S_G^i \in L(GE)$ ∀i and $G_i \in L(GE)$ ∀i

C2: $\{S_G^1 \ldots S_G^n\} \cap \{G_1 \ldots G_m\} = \phi$

C3: $x \in \Sigma$ iff $\exists g \in \{S_G^1 \ldots S_G^n\}$ such that $g = C_1 \ldots C_k$ x $C_{k+1} \ldots$, wherein $C_k \in \Sigma$ ∀k.

For an ASL gesture, two hands are used simultaneously to perform two gestures following Definition 1. Identification of gestures performed by both the hands is required.

Zero-shot learning for gestures has been studied and applied to some extent mostly in the field of human robot-interaction (HRI) and has been promising. The need for some form of semantic information or labeling of gestures is an issue that hinders zero-shot learning. For HRI, it is envisioned that a human interacting with a robot might want to use a novel and yet unfamiliar gesture to indicate a command. The robot has to first determine that a new gesture is out-of-vocabulary then it has to leverage some form of semantic information in the gesture to understand its meaning. There is a lot of uncertainty in this particular application, because AI agents, unlike humans, don't learn by fundamentally learning underlying concepts, thus transfer learning at a concept level is difficult. This factor is exhibited in recent research by Bilge et al., which uses a 3D CNN to learn characteristics of the whole gesture execution and then recognize new gestures in a zero-shot sense. However, they could only achieve an accuracy of 15%. A main advantage of the present system 100 is that the system 100 decomposes gestures into their canonical forms which have some correlation with unique concepts in the language. The present system 100 enables the neural network-based learning engines to learn concepts rather than examples.

ASL Data Collection and Preprocessing

IMPACT Lab Dataset

23 ASL gesture videos were collected with three repetitions each in real-world settings using a mobile application Learn2Sign (L2S) from 130 learners. No restrictions are laid for light conditions, distance to the camera, recording pose (either sitting or standing). The 23 gestures are used to generate a limited set of ASL alphabet and then 19 additional test gestures are chosen from two new users who are not part of the 130 learners.

Figures 4, 5:
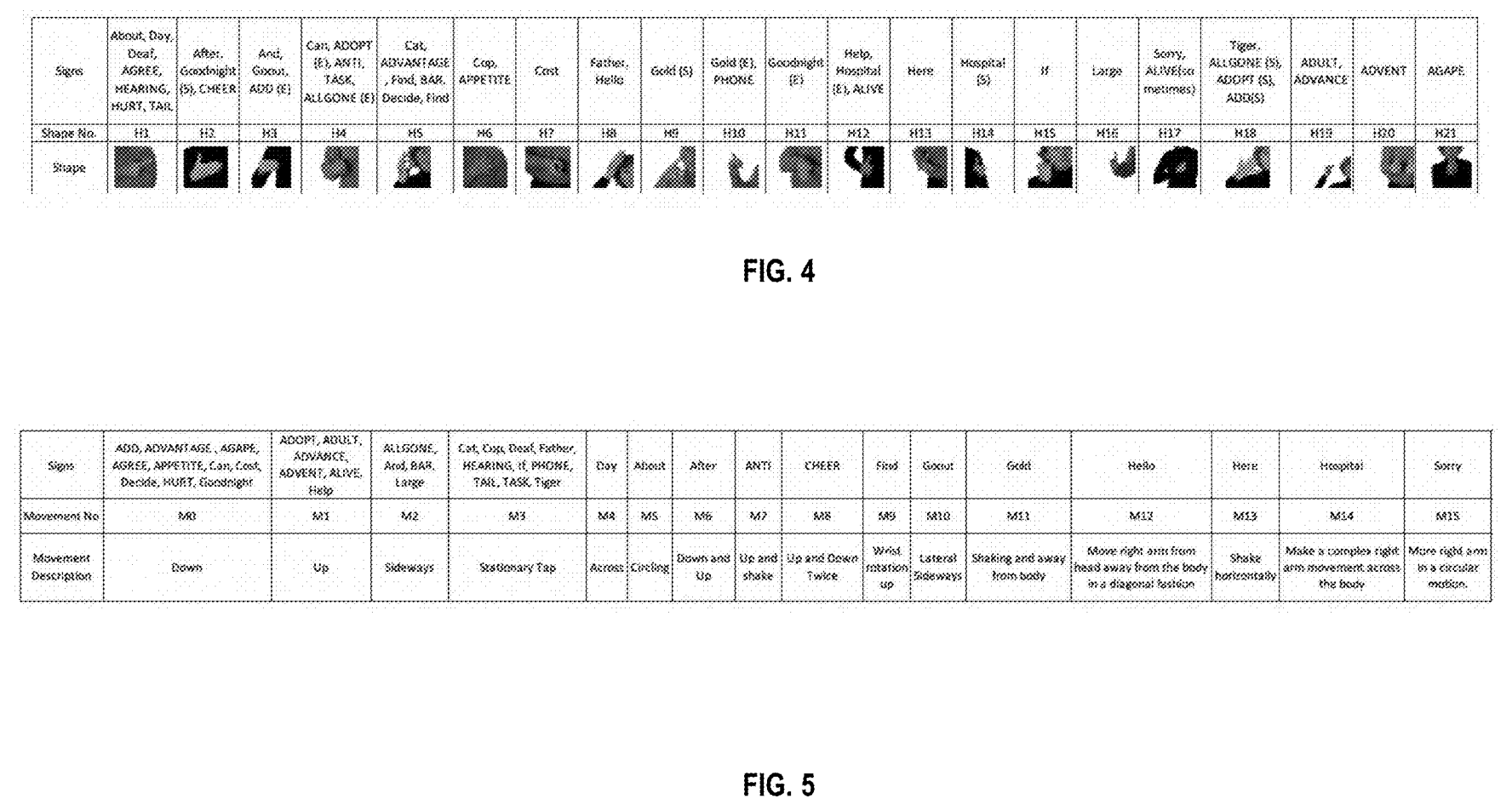

Out of these additional 19, three gestures have alphabets that are not part of the alphabet generated by the initial group of 23. The other 16 can be composed of the alphabet generated by the initial group of 23 using Equation 1 gesture expression. FIG. 4 shows the handshape alphabet generated by the 23 gestures and also shows the handshapes of the 19 test gestures. FIG. 5 shows the movement alphabet for the 23 training gestures and 19 test gestures. Location is divided into six buckets as any gesture can be classified in these six location buckets numbered with 0 to 5 bucket numbers forming the location alphabets.

ASLTEXT dataset: It is a subset of ASL Lexicon Video Dataset which is collected at Boston University from ASL native signers. The ASLTEXT consisting of 250 unique gestures. There were 1598 videos out of which 1200 videos of 190 gestures that were utilized not in the IMPACT dataset. The aim of the present disclosure is to utilize all 190 unique gestures as a test set to validate our zero-shot capabilities. No part of the ASLTEXT dataset is used for training purposes.

Approach

Location, handshape and movement are major parts that give meaning to any sign. In the present disclosure, the location, handshape and movement are referred to as tokens.

Referring to FIG. 2, the system 100 for gesture recognition is illustrated. FIG. 2 illustrates a training framework 102 for training the system 100 and a testing framework 104 for gesture recognition. The system 100 further includes a concept decomposition module 120 that includes a collection of neural network-based engines dedicated for extraction of each gesture component of a performed gesture. In particular, for ASL, the concept decomposition module 120 includes a handshape concept engine 122 for identifying a shape of a hand within a frame, a movement concept engine 123 for characterizing a physical movement of the hand relative to the body, and a location concept engine 124 for extracting a location of the hand relative to the body. For a plurality of frames indicative of a given gesture, the handshape concept engine 122 extracts a first set of gesture components 125 related to a shape of the hand, movement concept engine 122 extracts a second set of gesture components 126 related to the movement of the hand, and location concept engine 124 extracts a set of gesture components 127 related to the location of the hand. The system 100 further includes a definition module 128 that defines a language model for the gesture-based language, and the sets of concepts 125, 126 and 127 are used to define a plurality of examples of alphabets of the language model within the definition module 128.

The training framework 102 receives a set of training data 121 that can include a plurality of videos showing a finite number of gestures to learn from, as discussed above. Each engine 122, 123 and 124 of the concept decomposition module 120 is trained on the training data to extract concepts, or gesture components, from the gestures performed in the set of training data 121. The system 100 then assimilates a selection of top recognized gesture examples into the definition module 128 to define the alphabet for the language model.

The testing framework 104 uses the trained concept decomposition module 120 to extract a string of gesture components from a set of test data 141 and compares the gesture components with those stored in the definition module 128 at a definition match module 140. The definition match module 140 returns a recognition result 142 if the string of gesture components appropriately matches a definition stored within the definition module 128.

Figure 3A:
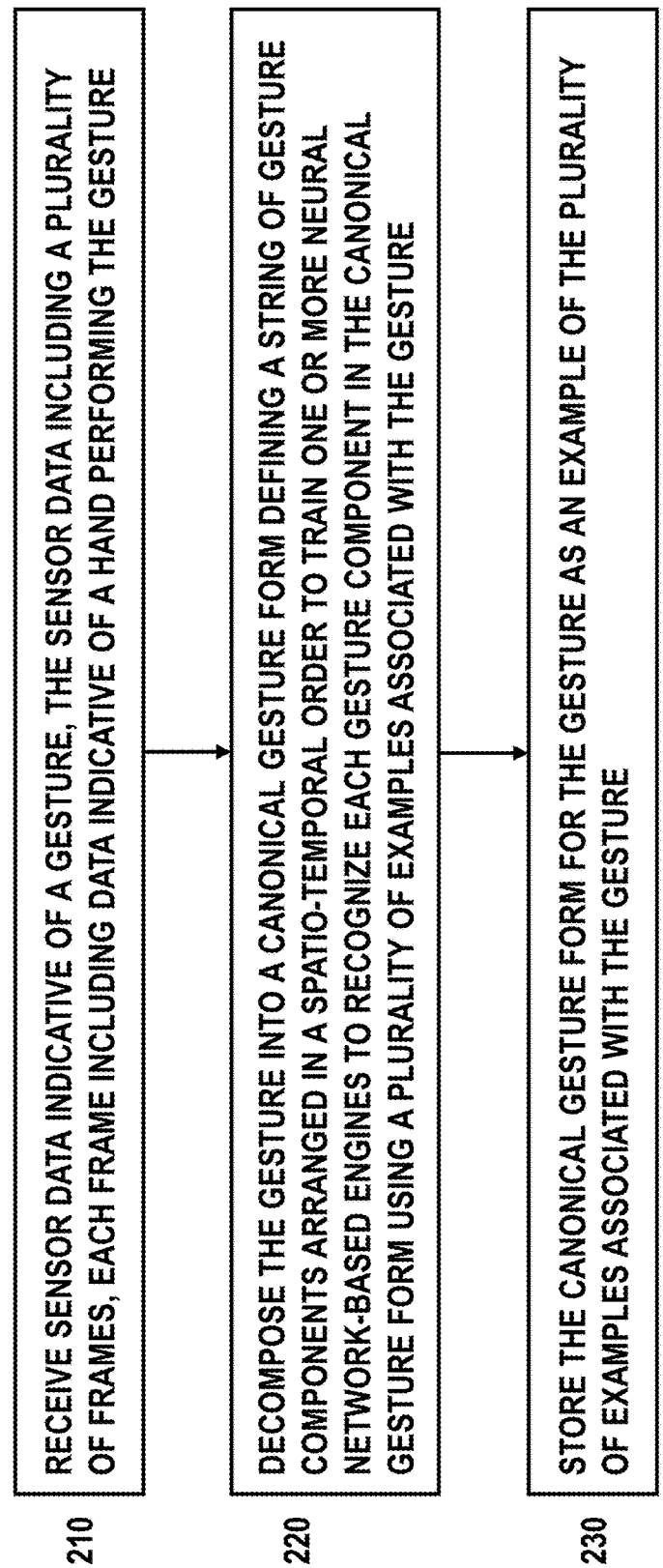

Referring to FIGS. 3A-3F, a corresponding process 200 is illustrated for gesture recognition using the system 100. Blocks 210-240 of FIG. 3A illustrate steps taken by training framework 102 and blocks 250-270 of FIG. 3F illustrate steps taken by testing framework 104 following training of the system 100. Referring directly to FIG. 3A, at block 210, the system 100 receives sensor data (training data 121) indicative of a gesture. The sensor data includes a plurality of frames, each frame including data indicative of a hand performing the gesture. At block 220, the concept decomposition module 120 decomposes the gesture into a canonical gesture form defining a string of gesture components arranged in a spatio-temporal order. During this decomposition step, one or more neural network-based engines 122, 123 and 124 of the decomposition module 120 are trained to recognize each gesture component in the canonical gesture form using a plurality of examples associated with the gesture. At block 230, the definition module 128 stores the canonical gesture form for the gesture as a single example of a plurality of examples associated with the gesture.

Referring to FIG. 3F, at block 250 the system 100 receives test data 141 including sensor data indicative of a gesture, the sensor data including a plurality of frames, each frame including data indicative of a hand performing the gesture. At block 260, the concept decomposition module 120 decomposes the gesture into a canonical gesture form using engines 122, 123 and 124, the canonical gesture form defining a string of gesture components arranged in a spatio-temporal order. The engines 122, 123 and 124 are each operable to recognize each gesture component in the canonical gesture form using a plurality of examples associated with the gesture. At block 270, the definition match module 140 compares the canonical gesture form for the gesture with a gesture definition and returns a recognition result 142 if the string of gesture components appropriately matches a definition stored within the definition module 128.

Token Recognition

A main goal of the system 100 is to recognize tokens from a gesture execution. Referring to FIG. 3B, the decomposition steps of blocks 220 and 260 include several sub-steps corresponding with the types of gesture components in the gesture language. For the present application of ASL to this system, as discussed, there are three types of gesture components: hand location, hand shape, and hand movement. At block 221, the location concept engine 124 extracts a first gesture component associated with a physical location of a palm of a hand relative to the body. At block 224, the movement concept engine 123 extracts, for a frame of the plurality of frames, a second gesture component associated with a physical movement of a palm of the hand relative to the body. At block 227, the handshape concept engine 122 extracts a third gesture component associated with a shape of the hand.

Figure 3C:
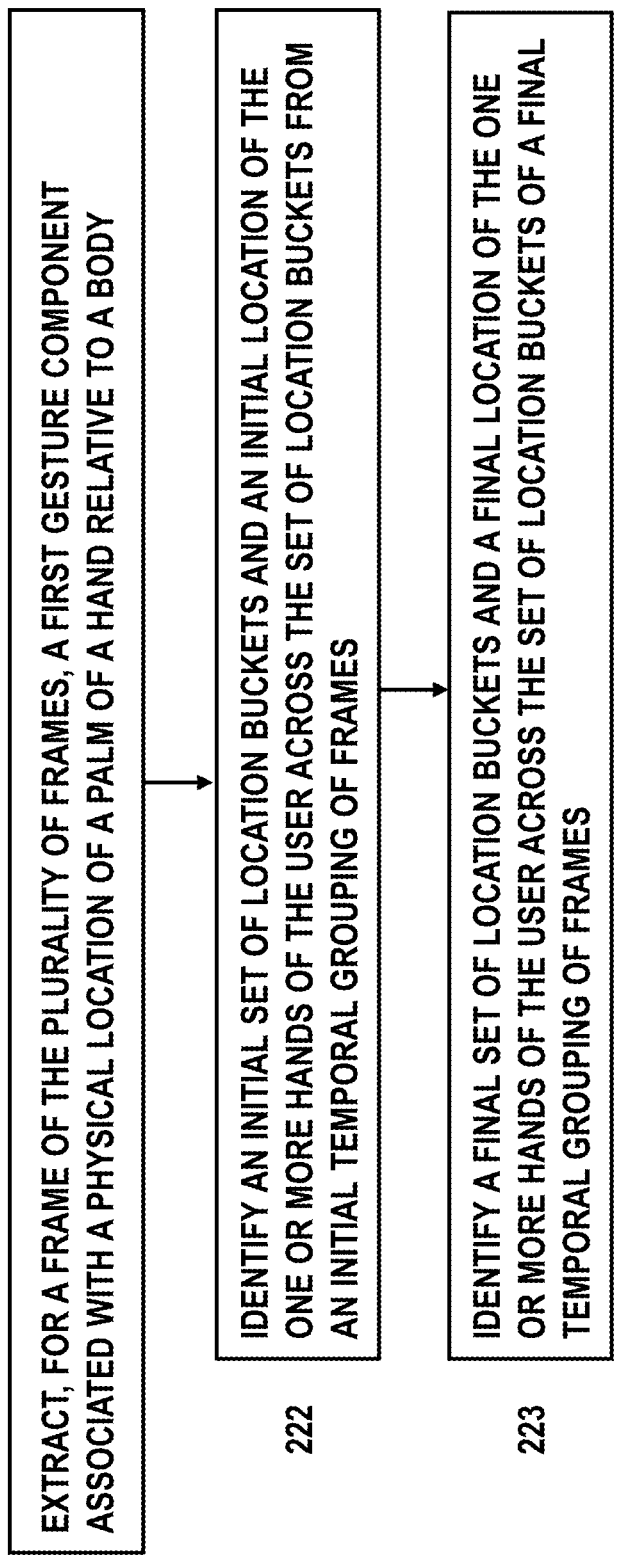

1) Location Recognition: Referring to FIGS. 2 and 3C, the location concept engine 124 of the system 100 considers two locations of the palm: a) start location (block 222) and b) end location (block 223). To achieve that, first consider the PoseNet model for real-time human pose estimation. Given a video frame, this model identifies joint positions such as wrist, nose, eyes, elbow, hips, and shoulders in a 2D space. For location estimation of the palm, the wrist joint is the most relevant information. First, the system 100 uses PoseNet to obtain the joint locations (key points) frame by frame from a video of ASL gesture execution. Since the present system 100 aims to understand the concept behind a given location where the gesture is executed, it is not necessary to find the exact pixel location. It is necessary to capture the location in a more granular manner that corresponds to proximity and relative position of the wrist or palm with respect to other significant body parts. Moreover, it is necessary to compare gesture executions by different individuals who have taken a video of gesture recognition in a constraint-free environment. Hence, the present system 100 will have to deal with several unwanted artifacts such as unequal frame sizes, different body sizes, and different starting points. Furthermore, ASL as a language does not have binding constraints on gesture execution. Hence, two individuals performing the same gesture may vary in their location, however, they have to represent the same general location with respect to the other parts of the body for semantic equivalence.

To overcome such issues, the present system 100 considers location bucketing with individualized bucket parameters. Consider the shoulders of a person to be a fixed reference. The system 100 then draws two axes: x-axis is the line that connects the two shoulder joints and the y-axis is perpendicular to the x-axis. The first bucket has a width equal to the shoulder width and height that extends to the top of the frame. The system 100 then uses five more buckets: a) top left that extends from left shoulder (viewer perspective) to the left edge of the frame along the x-axis and from shoulder to top edge of the frame along the y-axis, b) top right that extends from the right shoulder to the right edge of the frame along x-axis and shoulder to top edge of a frame along the y-axis, c) bottom that extends between the two shoulders along the x-axis and from shoulder to the bottom edge of the frame along the y-axis, d) bottom left and bottom right are same as the top left and top right except they extend from shoulder to the bottom frame edge. To compensate for exaggerated movements or differences in palm sizes, the forearm length is the distance between the wrist point and the elbow point and extended the wrist point by ⅓ of the arm length to approximately project the fingertip. The system 100 tracks the fingertip of the hand traversing through the location buckets across all frames. The features of the start and end location of the hand are captured through counting the number of times the projected hand is in the given bucket throughout the first half and second half of the video respectively. The overall result of this step is a 12-D vector where the first 6-D values correspond to the start location and the next 6-D values correspond to the end location and both are normalized separately.

Figure 3D:
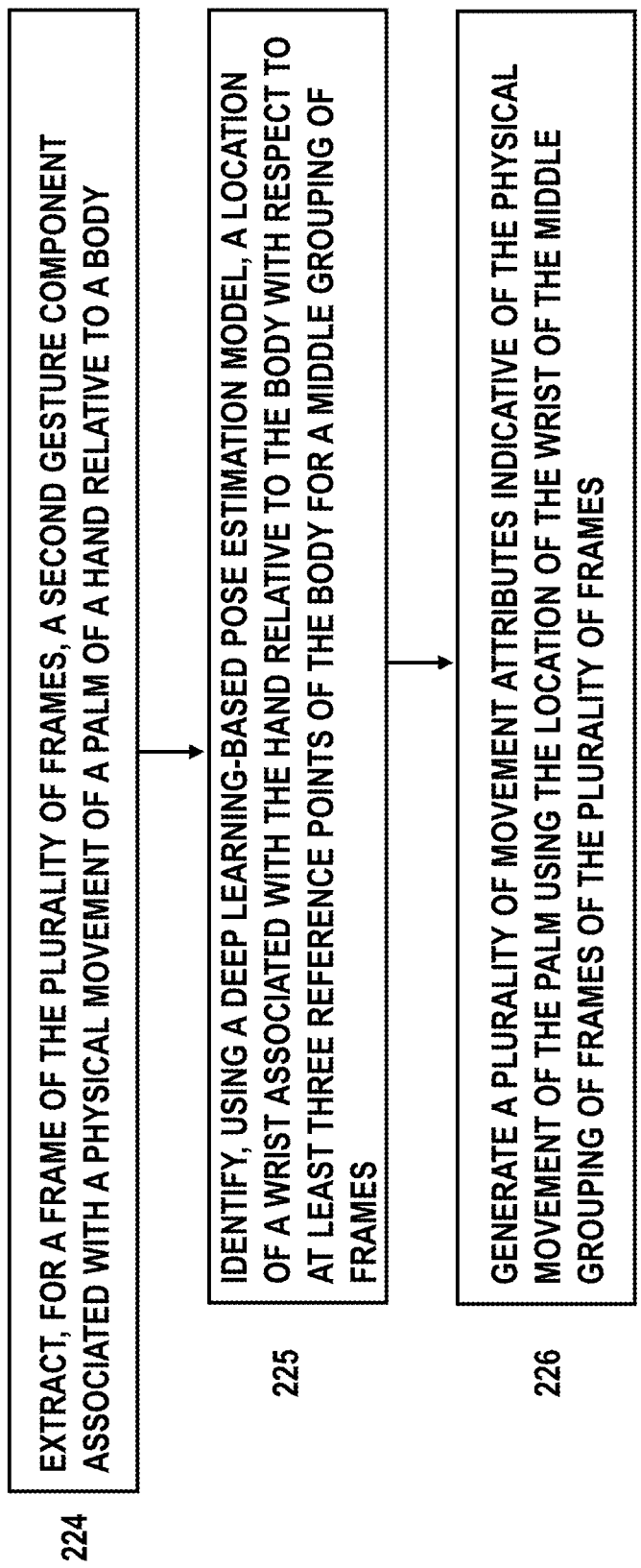

2) Movement Recognition: In the 23 seen gestures considered in this paper, the gestures have 16 unique movement patterns. These gestures are numbered 1 through 16. The aim of the system 100 once trained is, given execution of a gesture, to identify a top three numbered movement patterns of the gesture. Referring to FIGS. 2 and 3D, the movement concept engine 123 characterizes the physical movement of the gesture.

The PoseNet model for Real-Time Human Pose Estimation is used for extracting the movement attributes from the collected 2D videos for experiments. The TensorFlow-based ML model gives the coordinates of some parts of the human pose for every frame of the performer's video (block 225). Based on the x-axis and y-axis coordinates of some parts, a decent identification of hand gestures is possible.

For experimentation, the right wrist and left wrist hand movements are tracked since they are principal in performing the gestures. For finding similarity between the right-hand movement of two videos of different gestures: IF and DEAF in one illustrative case, the coordinates of nose, left-hip and right-hip are taken as the standard reference points since they persist as stationary points throughout the video. Based on a maximum accuracy score for the individual parts of the model, the corresponding coordinates are considered as reference.

The midpoint of the left and right hip is found and the distance between nose and this midpoint is taken as the torso height whereas the distance between the left and right hip is considered as the torso width for normalization. This kind of geometric scheme is made to balance orientation and scaling across any two videos. For both the videos, the new x and y movement coordinates are calculated as:

$$x_{new}^{wrist} = \frac{x_{old}^{wrist} - x_{nose}}{\text{hip} - \text{width}}, y_{new}^{wrist} = \frac{y_{old}^{wrist} - y_{nose}}{D_H}, \quad (2)$$

where $D_H$ is the distance between nose and the midpoint between left and right side of the hips. Thus, the new coordinates obtained are collected as movement attributes (block 226) from both the videos and compared with a suitable time-series metric like Dynamic Time Warping (DTW) in order to synchronize the different onset of movement between the videos. The final 2D-DTW score based on Euclidean distance obtained is used as the metric for similarity. The lower the score, the higher the similarity between any two videos. For each gesture in the database, a top three movement type matches are stored.

Figure 3E:
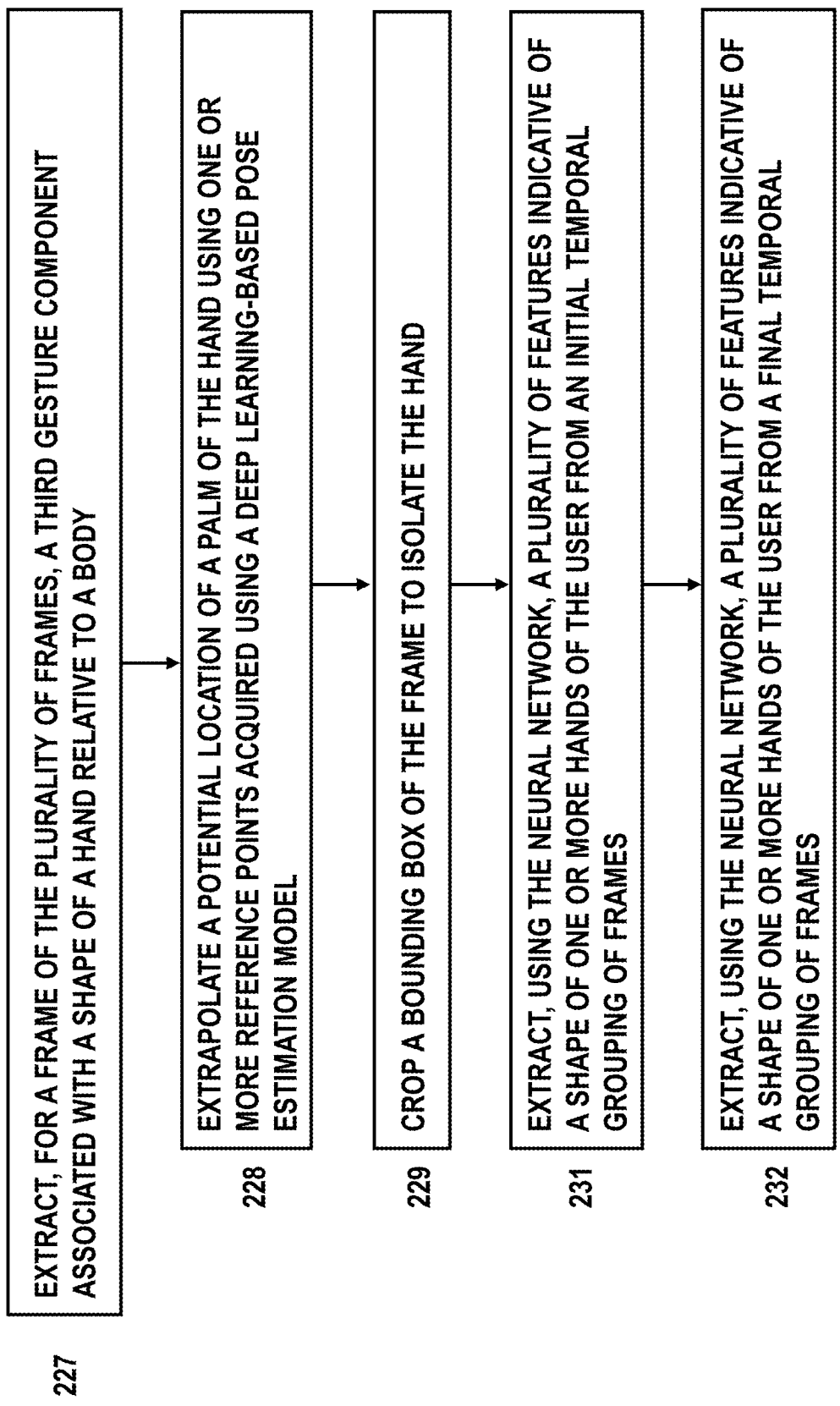
Figure 6:
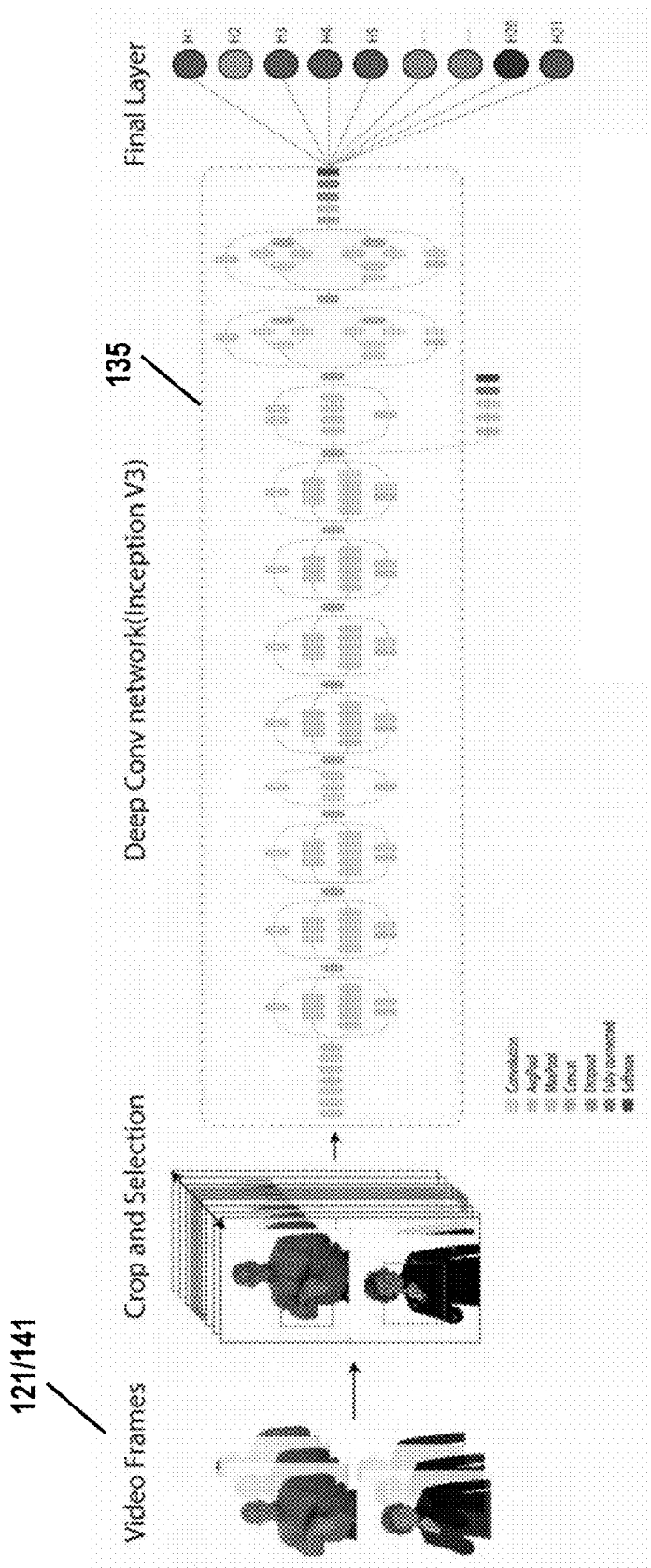
FIG. 6 is a diagram showing a handshape identification pipeline utilizing a deep convolutional neural network.

3) Handshape Recognition: ASL is a visual language and hand shape is an important part of identifying any sign. In the wild, videos produced by ASL users can have different brightness conditions, camera motion blurriness, and low-quality video frames. Deep learning models have shown to exceed human performances in many visual tasks like object recognition, reading medical imaging, and many other visual tasks. Referring to FIGS. 2, 3E and 6, the system 100 includes the handshape concept engine 122 for identifying a hand shape of the gesture. In one embodiment of the present system 100, a convolutional neural network (CNN) 135 is trained to recognize a shape formed by a hand featured in each frame. In some embodiments, the CNN 135 is a GoogleNet Inception v3 that has been trained on over 1.28 million of images with over 1,000 object categories. FIG. 6 shows a layout of the handshape recognition pipeline. From the experiments, it was concluded that cropping handshapes from frames before supplying to the CNN 135 give a better generalization and accuracies, allows the CNN 135 to converge faster to expected results. To reliably detect handshapes out of busy frame images, a simple algorithm is deployed to extrapolate potential hand palm location using key body positions acquired from pose estimation (block 228). It allows the present system 100 to confidently auto crop the handshapes bounding boxes (block 229). In the next phase, images including the hands are provided as input to the CNN 135 and the CNN 135 identifies a key handshape from the plurality of frames. In particular, in some embodiments the CNN 135 extracts hand shapes from an initial temporal grouping of frames from the beginning of the gesture (block 231) and from a final temporal grouping of frames from the end of the gesture (block 232), which also removes blurry transition handshapes.

Once, key handshapes are identified, traditional image augmentation techniques like random rotations and distortions are applied. With the final set of handshapes, the CNN 135 is retrained to allow the system 100 to use the final layer of the model as an automatic feature extractor. As a result of the handshape pipeline, video segments of any sign can be embedded to fixed vector representation that have shown to generalize well to previously unseen gestures.

For the training of the CNN 135, real-world data consisting of 23 gestures with 3 repetitions each from 130 learners was selected. The CNN 135 is retrained with handshape images from 23 gestures. For recognition of unseen gestures, 19 gestures with videos were selected. The unseen gestures are run through the same handshape pipeline, with CNN model acting as a feature extractor that produces a final feature vector. Once both unseen and seen signs are embedded into a fixed vector, a cosine similarity is calculated and a top-5 accuracy is produced.

Gesture Expression Matching

Referring to FIGS. 2 and 3F, the testing module 104 is responsible for the overall recognition of gesture handshapes. The incoming ASL video is first divided into frames (block 250). Typically, in the video of a gesture there are on an average 45 frames. Out of these 45, only six are considered for recognition of initial and final handshape and locations. The rest are used for movement identification. The entire recognition as performed by concept decomposition module 120 follows the steps below (block 260):

1) The first three frames are passed to the location recognition module to identify the initial location bucket.
2) The first three frames are passed to the handshape recognition module to identify the handshape alphabet.
3) The keypoints for the next 30 to 40 frames are then passed to the movement recognition module
4) The final three frames are first passed to the location recognition module
5) The final three frames are then passed to the handshape recognition module.

The output of these steps provides several combinations of initial location and handshape, movement and final location and handshape. Each such combination generates a string that can be derived from the regular expression in Equation 1. However, to recognize a gesture the derived string should match the definition of the gesture, and the gesture component string is compared with the gesture definitions stored in definition module 128 at block 270. There can be different degrees of match and in the results, two specific definitions of a match are considered: a) exact definition match, and b) partial match. A gesture video exactly matches a definition in terms of alphabets if initial defined handshape is among the top five initial recognized handshapes, initial defined location is within top three of recognized location, defined movement appears in top three recognized movement, final defined handshape appears in top five recognized handshapes, and final defined location appears in top three recognized locations. A partial match occurs when at most one out of five defined components does not appear in the top 3 recognition.

Results

In this section, the usage of canonical form is evaluated for zero-shot learning on ASL.

Evaluation Metrics

Two granularities of evaluation will be considered. Evaluation of each module: handshape, location, and movement. For modular evaluation, top k match is considered. Since handshape is the most complex and most diverse component of a gesture, top 5 match is considered. For location and movement, top 3 match is considered. Matches are expressed in terms of the alphabet and also in terms of the training gestures from which the alphabet was derived.

Evaluation of the overall recognition: Consider success rate $$SR = 100 \frac{N_S}{N_T},$$

where $N_S$ is the number of unseen test gestures which were successfully recognized using the full definition following the canonical form, and NT is the total number of test gestures which only have alphabets that are seen in the training examples. Bloating factor $$B_F = 100 \frac{N_S + N_{Tr}}{N_{Tr}}$$

is also considered, where $N_{Tr}$ is the number of training examples. This factor is a measure of the capability of the present system 100 to extend gesture vocabulary using limited training examples.

FIG. 7 shows the statistics for three separate users not available in the training set of users for the 19 previously unseen gestures. This table is used to evaluate performance of each module and the overall performance of the zero-shot recognition system. The table lists the test gestures in the first column, where grey boxes indicate successful zero-shot recognition, white boxes indicate unsuccessful recognition, and light grey boxes indicate gestures that introduce new alphabets and are unrecognizable. The second column has the definition of each test gesture following the canonical form of Equation 2. The next five columns show top 5 handshape recognition results, the next three show top 3 movement recognition results and the next 3 show top 3 location recognition results. In the present disclosure, for lack of space, only the right hand recognition results are shown, but the same results can be available for the left hand. For gestures that have a change in handshape during execution, two handshapes have to be recognized. A zero-shot recognition is determined to be successful if both start and end handshapes are in top 5, movement is in top 3 and location is in top 3.

Evaluation of Each Module

1) Handshape: As seen in FIG. 7, TAIL, AGAPE, and ADVENT have gesture components that contribute new alphabets to the language. Hence, these gestures are considered to be unrecognizable with the given alphabet set. Yet for evaluating individual components they will be used whenever fit. For handshape recognition, Advent and Agape contribute new handshape alphabets but TAIL does not. From the results table in FIG. 7 it can be shown that if the top 5 handshape recognition accuracy is considered, then the present system 100 has an identification accuracy of 70%. Although this is low as compared to several image recognition techniques including handshape recognition, this accuracy is for zero-shot recognition. The only competing technology for zero-shot gesture recognition could achieve accuracy of 51.4%. It is believed that the main reason for the improvement in accuracy is that concepts are encoded in a canonical form which can be generalized across domains, whereas Bilge et al are encoding individual examples in terms of attributes such as 3D CNN activation levels, which inherently do not capture any concept information. Further, the present system's training examples used videos collected in noisy environments with varying backgrounds which by no means match the definition of clean. The test videos are from a totally different set of human users that were not available in the training set. As a result, the recognition accuracy of 70% is for zero-shot user-independent handshape recognition.

Moreover, the present system considers gestures where handshape changes during execution. For example, if ADOPT is considered, the initial handshape is H18 but the final handshape is H4. The handshape recognition system is actually partially correct in identifying handshape. But the recognition of ADOPT is considered to be a failure because the start handshape is not recognized. Two other such examples, ADD and ALLGONE, were recognized even though the handshape changed during execution.

2) Movement: The gesture TAIL introduces a new movement in the alphabet. Moreover, this new movement has no motion of the wrist and pivoting the wrist the user waves the index finger. This motion cannot be captured by PoseNet architecture. Hence it is unrecognizable in the system. So, this example is discarded from the evaluation. From the results table in FIG. 7, it is shown that the overall accuracy of zero-shot user-independent movement recognition considering top 3 results was 83%. One of the limitations of the present system's 100 movement recognition ability comes from the restriction in PoseNet where the palm cannot be tracked, as there is only a key point on the wrist. The movement captured at the wrist is less vigorous making it difficult to capture.

In other test cases, the word ADVANCE was not recognized due to failure to recognize the movement although handshape and location were recognized correctly. The reason for this is that ADVANCE uses the movement of both hands. The PoseNet results actually confused between the left and right arm and designated some of the right wrist points as left wrist points. This factor resulted in failure of movement recognition.

3) Location: The location provides almost perfect accuracy and, which is expected, as there are only 6 buckets representing general proximity areas, where the signer is using their palms, thus a lot of gestures fall with similar areas. This does not affect results significantly, because the present system 100 doesn't consider each module as independent recognizer, but rather treats a configuration of handshape, motion, and location as a whole. Thus, if there are two gestures that have identical handshape and movement, but are executed in a different location, the present system 100 would be able to recognize them as different signs. For all the 19 unseen gestures, the top 3 results are determined and the location module correctly finds mapped locations and recognizes the approximate locations.

Evaluation of Overall Zero-Shot Recognition

Of the 19 gestures considered for zero-shot learning, three introduced a new alphabet and were considered unrecognizable. Hence, the overall zero-shot recognition accuracy is evaluated out of 16 gestures by omitting TAIL, AGAPE, ADVENT. Out of the 16 unknown gesture examples, the system 100 could correctly identify 10 gestures consistently across three previously unseen users giving us a success rate of SR=66.6% for the whole gesture. This is four times higher than competing technology that can achieve a success rate of only 15%. This indicates that given a training gesture set comprising of 23 gestures, an additional 10 gestures can be identified only from their definition without obtaining training video. Hence the bloating factor $B_F$=143%.

This is a significant result since it can potentially be a significant step towards complete automated sign sequence to sentence translation of any sign language communication. This result indicates that through the learning of the unique concepts of a gesture-based language (the alphabets in this case) it is possible to recognize a large set of gestures given a small and limited set of examples.

Evaluation on the ASLTEXT Dataset

To further evaluate the usefulness of canonical form representation of gestures and its ability to facilitate zero-shot application, the present system 100 was tested against the ASLTEXT dataset introduced in an earlier section. 190 unique gestures and 1200 videos were identified that were completely disjoint from any gestures and videos that were trained on. Instead of splitting the dataset into 170, 30,50 disjoint classes as train, validation, test set, respectively, 190 unique unseen gestures were used as the test set only and none were used to retrain the model. It represents the eight-fold test set size increase compared to 23 unique gestures that have been trained on. For each of unseen gesture, the definition of the given class is assumed in terms of the ASL alphabets discussed in Definition 2.

Figure 8:
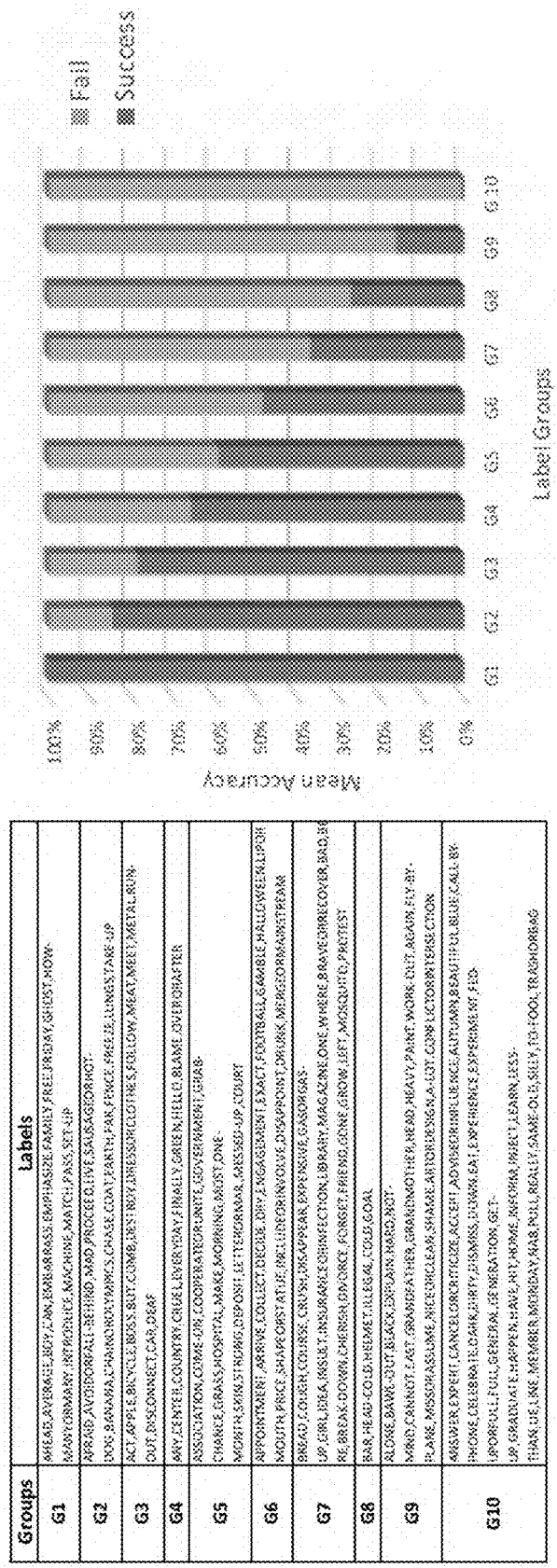
FIG. 8 is a diagram showing zero-shot recognition accuracy for handshapes from 190 unique ASL gestures from an ASLTEXT dataset.

For recognition of gestures in the ASLTEXT dataset, we follow the same recognition pipeline protocol described aboveB. As seen in FIG. 8, handshape recognition is performed on all 190 unseen gestures. For the sake of concise representation, labels were grouped on the left side of the figure. The figure on the right shows mean accuracy scores per group. Example G1 labels that have 100 percent accuracy G10 accuracy of zero percent. Please note that each label has six video instances on average. Out of the 190 unseen or novel gestures, handshapes of 48 gestures were correctly identified with accuracy ≥70%, 45 gestures with accuracy ≥80%, and 16 gestures with 100% accuracy. Each sign on an average had six videos executed by five different users. Out of 1200 test videos for the 190 gestures, 66% percent handshape recognition normalized accuracy was recorded on the ASLTEXT dataset. For location recognition, for the 190 gestures considered from the dataset, a 74% accuracy is reported for the top three start and end locations. For movement detection, an accuracy of 73% was obtained.

Evaluation of ASLTEXT Zero-Shot Recognition

In the ASLTEXT dataset on an average each gesture has six repetitions by different individuals. As such, SR can be parameterized on how many of the repetitions can be recognized correctly. If 100% of repetitions have to be correctly recognized, then a SR of 3% is achieved, i.e. six new gestures. The associated bloating factor is (23+9+6)/23=165% since training was only used for 23 ASL gestures and the present system 100 could recognize nine gestures from the IMPACT dataset and 6 from ASLTEXT. With 90%, 80%, and 70% and 60% correct recognition of repetitions, the present system 100 can recognize 7 (SR 3.68%, BF 169%), 22 (SR 11.58%, BF 245%), 34 (SR 17.89%, BF 287%), and 55 (28.95%, BF 378%) new gestures, respectively.

Comparison with state-of-art: Bilge et al. reports a zero-shot recognition accuracy on ASLTEXT dataset of 51.4% on 50 unseen gestures. However, they have used 170 gestures from ASLTEXT as training, whereas no examples from ASLTEXT were used for training. Moreover, the accuracy metric used does not specify how many unseen gestures were actually recognized. If the total number of videos were correctly recognized out of 1200 from 190 gestures, a normalized accuracy of 66% is reported. This 13.6% increase in accuracy is significant because no part of ASL-TEXT was used as training.

Discussion and Conclusions

In this disclosure, one usage of the canonical form representation of gestures is demonstrated. Zero-shot recognition of gestures is useful because with training data available from a small subset of gestures many more unseen gestures with definitions can be recognized. However, there are several other advantages of a canonical form representation. A canonical form is in terms of handshape, location and movement and is independent of any sign language semantics. As such the same alphabet can be associated with semantics specific to a different sign language. Hence, the canonical form can be independent of the language. If a module is developed that can automatically convert a sequence of gestures in any language into a canonical form, then it can enable automated translation between sign languages.

Another advantage of a canonical form is gesture-based search and mining. This can be useful in the disabilities education domain. Gesture transcripts of educational material for the Deaf and Hard of Hearing students can be searched using gesture inputs.

Linguistics research in the domain of ASL has long attempted to develop a common transcription language for gestures. Efforts have resulted in resources such as Sign-Type, which is an extensive and granular method of representing ASL gestures. A goal of this research is to automatically convert ASL gestures into a representation like SignType. However, SignType examples are currently generated through and have significant variance and are not currently usable.

Video recordings were collected of gesture performances from 130 users on 23 ASL gestures with 3 repetitions each resulting in a total of 8970 videos.

For zero-shot recognition of gesture videos, greater than 15% improvement is shown over currently existing technology. The present system 100 achieves better zero-shot accuracy because it focuses on learning useful concepts from limited examples and uses them through canonical forms to compose other gestures.

Computer-Implemented System

Figure 9:
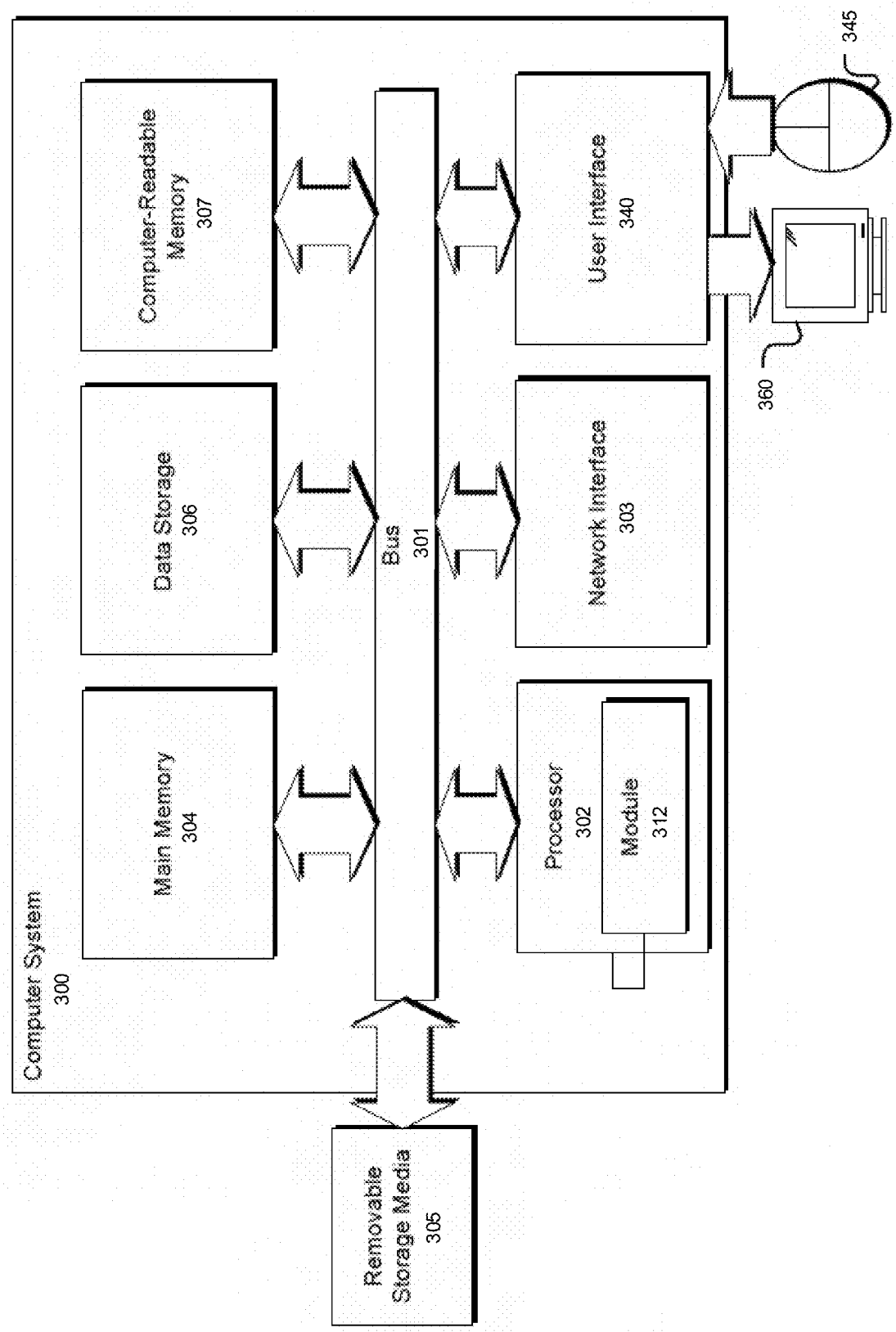
FIG. 9 is an example computing device for implementation of the system of FIG. 2 and the processes of FIGS. 3A-3F.

FIG. 9 illustrates an example of a suitable computing and networking environment (computer system 300) which may be used to implement various aspects of the present disclosure. Example embodiments described herein may be implemented at least in part in electronic circuitry; in computer hardware executing firmware and/or software instructions; and/or in combinations thereof. Example embodiments also may be implemented using a computer program product (e.g., a computer program tangibly or non-transitorily embodied in a machine-readable medium and including instructions for execution by, or to control the operation of, a data processing apparatus, such as, for example, one or more programmable processors or computers). A computer program may be written in any form of programming language, including compiled or interpreted languages, and may be deployed in any form, including as a stand-alone program or as a subroutine or other unit suitable for use in a computing environment. Also, a computer program can be deployed to be executed on one computer, or to be executed on multiple computers at one site or distributed across multiple sites and interconnected by a communication network.

Certain embodiments are described herein as including one or more modules. Such modules are hardware-implemented, and thus include at least one tangible unit capable of performing certain operations and may be configured or arranged in a certain manner. For example, a hardware-implemented module may comprise dedicated circuitry that is permanently configured (e.g., as a special-purpose processor, such as a field-programmable gate array (FPGA) or an application-specific integrated circuit (ASIC)) to perform certain operations. A hardware-implemented module may also comprise programmable circuitry (e.g., as encompassed within a general-purpose processor or other programmable processor) that is temporarily configured by software or firmware to perform certain operations. In some example embodiments, one or more computer systems (e.g., a stand-alone system, a client and/or server computer system, or a peer-to-peer computer system) or one or more processors may be configured by software (e.g., an application or application portion) as a hardware-implemented module that operates to perform certain operations as described herein.

Accordingly, the term "hardware-implemented module" encompasses a tangible entity, be that an entity that is physically constructed, permanently configured (e.g., hardwired), or temporarily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software, in the form of the process 200 or otherwise, may include a hardware-implemented module and may accordingly configure a processor 302, for example, to constitute a particular hardware-implemented module at one instance of time and to constitute a different hardware-implemented module at a different instance of time.

Hardware-implemented modules may provide information to, and/or receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and may store the output of that operation in a memory device to which it is communicatively coupled. A further hardware-implemented module may then, at a later time, access the memory device to retrieve and process the stored output. Hardware-implemented modules may also initiate communications with input or output devices.

As illustrated, the computing and networking environment 300 may be a general purpose computing device 300, although it is contemplated that the networking environment 300 may include other computing systems, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments that include any of the above computing systems or devices, and the like.

Components of the general purpose computing device 300 may include various hardware components, such as a processing unit 302, a main memory 304 (e.g., a memory or a system memory), and a system bus 301 that couples various system components of the general purpose computing device 300 to the processing unit 302. The system bus 301 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The general purpose computing device 300 may further include a variety of computer-readable media 307 that includes removable/non-removable media and volatile/nonvolatile media, but excludes transitory propagated signals. Computer-readable media 307 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EPSOM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the general purpose computing device 300. Communication media includes computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The main memory 304 includes computer storage media in the form of volatile/nonvolatile memory such as read only memory (ROM) and random access memory (RAM). A basic input/output system (BIOS), containing the basic routines that help to transfer information between elements within the general purpose computing device 300 (e.g., during start-up) is typically stored in ROM. RAM typically contains data and/or program modules that are immediately accessible to and/or presently being operated on by processing unit 302. For example, in one embodiment, data storage 306 holds an operating system, application programs, and other program modules and program data.

Data storage 306 may also include other removable/non-removable, volatile/nonvolatile computer storage media. For example, data storage 306 may be: a hard disk drive that reads from or writes to non-removable, nonvolatile magnetic media; a magnetic disk drive that reads from or writes to a removable, nonvolatile magnetic disk; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media provide storage of computer-readable instructions, data structures, program modules and other data for the general purpose computing device 300.

A user may enter commands and information through a user interface 340 or other input devices 345 such as a tablet, electronic digitizer, a microphone, keyboard, and/or pointing device, commonly referred to as mouse, trackball, or touch pad. Other input devices 345 may include a joystick, game pad, satellite dish, scanner, or the like. Additionally, voice inputs, gesture inputs (e.g., via hands or fingers), or other natural user interfaces may also be used with the appropriate input devices, such as a microphone, camera, tablet, touch pad, glove, or other sensor. These and other input devices 345 are often connected to the processing unit 202 through a user interface 340 that is coupled to the system bus 301, but may be connected by other interface and bus structures, such as a parallel port, game port or a universal serial bus (USB). A monitor 360 or other type of display device is also connected to the system bus 301 via user interface 340, such as a video interface. The monitor 360 may also be integrated with a touch-screen panel or the like.

The general purpose computing device 300 may operate in a networked or cloud-computing environment using logical connections of a network Interface 303 to one or more remote devices, such as a remote computer. The remote computer may be a personal computer, a server, a router, a network PC, a peer device or other common network node, and typically includes many or all of the elements described above relative to the general purpose computing device 200. The logical connection may include one or more local area networks (LAN) and one or more wide area networks (WAN), but may also include other networks. Such networking environments are commonplace in offices, enterprise-wide computer networks, intranets and the Internet.

When used in a networked or cloud-computing environment, the general purpose computing device 300 may be connected to a public and/or private network through the network interface 303. In such embodiments, a modem or other means for establishing communications over the network is connected to the system bus 301 via the network interface 303 or other appropriate mechanism. A wireless networking component including an interface and antenna may be coupled through a suitable device such as an access point or peer computer to a network. In a networked environment, program modules depicted relative to the general purpose computing device 300, or portions thereof, may be stored in the remote memory storage device.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A system, comprising:
 a sensor operable to capture sensor data indicative of a gesture; and
 a processor in communication with a memory and the sensor, the processor configured to execute instructions stored in the memory, which, when executed, cause the processor to:
  receive sensor data indicative of a gesture, the sensor data including a plurality of frames, each frame of the plurality of frames including data indicative of a hand performing the gesture;
  decompose the gesture into a canonical gesture form, the canonical gesture form defining a string of gesture components arranged in a spatio-temporal order;
  store the canonical gesture form for the gesture as a single example of a plurality of examples associated with the gesture; and
  train a neural network to recognize a gesture component in the canonical gesture form using the plurality of examples associated with the gesture,
  wherein the processor is further configured to
   extract, for a frame of the plurality of frames, a second gesture component associated with a physical movement of the palm of a hand relative to a body;
   identify a location of a wrist associated with the hand relative to the body with respect to at least three reference points of the body for a middle grouping of frames of the plurality of frames; and
   generate a plurality of movement attributes indicative of the physical movement of the palm using the locations of the wrist of the middle grouping of frames of the plurality of frames.

2. The system of claim 1, further comprising instructions stored in the memory, which, when executed, cause the processor to:
 extract, for a frame of the plurality of frames, a first gesture component associated with a physical location of a palm of a hand relative to a body.

3. The system of claim 2, further comprising instructions stored in the memory, which, when executed, cause the processor to:
 identify an initial set of location buckets and an initial location of the one or more hands of the user across the set of location buckets from an initial temporal grouping of frames of the plurality of frames.

4. The system of claim 2, further comprising instructions stored in the memory, which, when executed, cause the processor to:
 identify a final set of location buckets and a final location of the one or more hands of the user across the set of location buckets of a final temporal grouping of frames of the plurality of frames.

5. The system of claim 1, wherein the location of the wrist is identified using a deep learning-based pose estimation model.

6. The system of claim 1, further comprising instructions stored in the memory, which, when executed, cause the processor to:
 extract, for a frame of the plurality of frames, a third gesture component associated with a shape of a hand relative to a body.

7. The system of claim 6, further comprising instructions stored in the memory, which, when executed, cause the processor to:
 extrapolate a potential location of a palm of the hand using one or more reference points acquired using a deep learning-based pose estimation model; and
 crop a bounding box to isolate the hand.

8. The system of claim 6, further comprising instructions stored in the memory, which, when executed, cause the processor to:
 extract, using the neural network, a plurality of features indicative of a shape of one or more hands of the user from an initial temporal grouping of frames of the plurality of frames.

9. The system of claim 6, further comprising instructions stored in the memory, which, when executed, cause the processor to:
 extract, using the neural network, a plurality of features indicative of a shape of one or more hands of the user from an initial temporal grouping of frames of the plurality of frames.

10. A method, comprising:
receiving sensor data indicative of a gesture at a processor, wherein the sensor data includes a plurality of frames and wherein each frame includes data indicative of a hand performing the gesture;
extracting, for a frame of the plurality of frames, a gesture component associated with a shape of a hand relative to a body;
converting the gesture into a canonical gesture form, the canonical gesture form defining a string of gesture components arranged in a spatio-temporal order;
storing the canonical gesture form for the gesture as a single example of a plurality of examples associated with the gesture; and
training a neural network to recognize each gesture component in the canonical gesture form using the plurality of examples associated with the gesture, including
extrapolating a potential location of a palm of the hand using one or more reference points acquired using a deep learning-based pose estimation model; and
cropping a bounding box to isolate the hand.

11. The method of claim 10, further comprising instructions stored in the memory, which, when executed, cause the processor to:
extracting, for a frame of the plurality of frames, a first gesture component associated with a physical location of a palm of a hand relative to a body.

12. The method of claim 11, further comprising instructions stored in the memory, which, when executed, cause the processor to:
identifying an initial set of location buckets and an initial location of the one or more hands of the user across the set of location buckets from an initial temporal grouping of frames of the plurality of frames.

13. The method of claim 11, further comprising instructions stored in the memory, which, when executed, cause the processor to:
identifying a final set of location buckets and a final location of the one or more hands of the user across the set of location buckets of a final temporal grouping of frames of the plurality of frames.

14. The method of claim 10, further comprising instructions stored in the memory, which, when executed, cause the processor to:
extracting, for a frame of the plurality of frames, a second gesture component associated with a physical movement of the palm of a hand relative to a body.

15. The method of claim 14, further comprising instructions stored in the memory, which, when executed, cause the processor to:
identifying, using a deep learning-based pose estimation model, a location of a wrist associated with the hand relative to the body with respect to at least three reference points of the body for a middle grouping of frames of the plurality of frames; and
generating a plurality of movement attributes indicative of the physical movement of the palm using the location of the wrist of the middle grouping of frames of the plurality of frames.

16. The method of claim 10, further comprising instructions stored in the memory, which, when executed, cause the processor to:
extracting, using the neural network, a plurality of features indicative of a shape of one or more hands of the user from an initial temporal grouping of frames of the plurality of frames.

17. The method of claim 10, further comprising instructions stored in the memory, which, when executed, cause the processor to:
extracting, using the neural network, a plurality of features indicative of a shape of one or more hands of the user from a final temporal grouping of frames of the plurality of frames.

18. A system, comprising:
a sensor operable to capture sensor data indicative of a gesture; and
a processor in communication with a memory and the sensor, the processor configured to execute instructions stored in the memory, which, when executed, cause the processor to:
receive sensor data indicative of an unseen gesture, wherein the sensor data includes a plurality of frames and wherein each frame includes data indicative of a hand performing the unseen gesture;
convert the unseen gesture into a canonical gesture form using a neural network trained to recognize unseen gestures using canonical forms of classes, the canonical gesture form defining a string of gesture components arranged in a spatio-temporal order, the neural network being operable to recognize each concept in the canonical gesture form using a plurality of examples associated with the unseen gesture; and
compare the canonical gesture form for the unseen gesture with a gesture definition to recognize the unseen gesture, wherein the gesture definition includes a plurality of constraints associated with a plurality of gesture components.

* * * * *